US009054978B2

(12) United States Patent
Shinohara et al.

(10) Patent No.: US 9,054,978 B2
(45) Date of Patent: Jun. 9, 2015

(54) PATH SELECTION METHOD AND CONTROL SERVER

(75) Inventors: Yusuke Shinohara, Tokyo (JP); Yasunobu Chiba, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 13/983,760

(22) PCT Filed: Feb. 6, 2012

(86) PCT No.: PCT/JP2012/052614
§ 371 (c)(1),
(2), (4) Date: Aug. 5, 2013

(87) PCT Pub. No.: WO2012/108383
PCT Pub. Date: Aug. 16, 2012

(65) Prior Publication Data
US 2013/0308463 A1  Nov. 21, 2013

(30) Foreign Application Priority Data
Feb. 7, 2011  (JP) ................. 2011-024046

(51) Int. Cl.
G06F 15/173 (2006.01)
H04L 12/801 (2013.01)
H04L 12/751 (2013.01)
(Continued)

(52) U.S. Cl.
CPC ............ *H04L 47/12* (2013.01); *H04L 45/12* (2013.01); *H04L 45/22* (2013.01); *H04L 45/02* (2013.01); *H04L 45/124* (2013.01); *H04L 45/70* (2013.01)

(58) Field of Classification Search
CPC ......... H04L 47/12; H04L 45/00; H04L 45/02; H04L 45/18; H04L 45/12; H04L 45/128; H04L 45/22; H04L 45/70; H04L 45/124; H04L 67/1002; H04W 28/08
USPC ................. 370/235, 238, 254, 351, 352, 400; 709/227, 238, 244
See application file for complete search history.

(56) References Cited

U.S. PATENT DOCUMENTS 4,905,233 A * 2/1990 Cain et al. ..................... 370/237
7,859,993 B1 * 12/2010 Choudhury et al. .......... 370/217
(Continued)

FOREIGN PATENT DOCUMENTS

CN  101388835 A  3/2009
CN  101600227 A  12/2009
(Continued)

OTHER PUBLICATIONS

International Search Report dated Apr. 24, 2012 in PCT/JP2012/052614, with English translation thereof.
(Continued)

*Primary Examiner* — Afsar M Qureshi
(74) *Attorney, Agent, or Firm* — McGinn IP Law Group, PLLC

(57) ABSTRACT

A path selection method includes: calculating an inter-node traffic forwarding probability from a parameter value relating to path selection; calculating a link cost when the parameter value is used by using the inter-node traffic forwarding probability and a communication amount; calculating a cost that a traffic flow experiences end-to-end by using the inter-node traffic forwarding probability and the link cost; and using an inter-node traffic forwarding probability with which the cost reaches a minimum value.

17 Claims, 6 Drawing Sheets

(51) Int. Cl.
*H04L 12/721* (2013.01)
*H04L 12/707* (2013.01)

(56) References Cited

U.S. PATENT DOCUMENTS

| | | | | |
|---|---|---|---|---|
| 7,945,678 | B1* | 5/2011 | Skene | 709/227 |
| 2004/0146007 | A1* | 7/2004 | Saadawi et al. | 370/238 |
| 2006/0182034 | A1* | 8/2006 | Klinker et al. | 370/238 |
| 2008/0275999 | A1* | 11/2008 | Yanagihara | 709/232 |
| 2011/0205898 | A1* | 8/2011 | Ichiki et al. | 370/235 |

FOREIGN PATENT DOCUMENTS

| | | | |
|---|---|---|---|
| EP | | 2043311 A1 | 4/2009 |
| WO | WO 2010144001 A1 | | 12/2010 |

OTHER PUBLICATIONS

Edsger W. Dijkstra, "A Note on Two Problems in Connexion with Graphs" Numerische Mathematik, vol. 1, pp. 269-271 (1959).

D. Eppstein, "Finding the k Shortest Paths," Mar. 31, 1997.

Y. Honma, M. Aida, H. Shimonishi and A. Iwata, "A New Multi-path Routing Methodology Based on Logit Type Assignment," In FutureNet II, 2009.

Yusuke Shinohara, Yasunobu Chiba, Hideyuki Shimonishi, Yudai Honma, Masaki Aida, "An Efficient Multipath Routing Algorithm for Datacenter Networks and its Implementation on OpenFlow-based Network," IEICE, vol. 109, No. 448, NS2009-164, pp. 13-18.

Nick McKeown, and seven others, "OpenFlow: Enabling Innovation in Campus Networks," [online], [searched on Feb. 4, 2011], Internet <http://www.openflowswitch.org/documents/openflow-wp-latest.pdf>.

Yudai Honma et al.,"Generalization of MLB Routing Protocol with Respect to Filtering Candidate Paths and Optimal Parameter Setting", IEICE Technical Report, Jan. 13, 2011, vol. 110, No. 372, pp. 13-18.

Shinohara et al., "An Efficient Multipath Routing Algorithm for Datacenter Networks and Its Implementation on OpenFlow based Network" IEICE Technical Report, Feb. 25, 2010, vol. 109, No. 448, pp. 13-18.

Chinese Office Action dated Feb. 2, 2015 with an English Translation.

* cited by examiner

FIG. 4
<FORWARDING PROBABILITY TABLE 400-i FOR TARGET NODE 5-i>

| DESTINATION NODE | NEXT HOP NODE | SELECTION PROBABILITY |
|---|---|---|
| 5 - 1 | 5 - i 1 ( 1 ) | P i 1 ( 1 ) |
|  | 5 - i 1 ( 2 ) | P i 1 ( 2 ) |
|  | ... | ... |
| 5 - j<br>( j = 1 ~ n ≠ i ) | 5 - i j ( 1 ) | P i j ( 1 ) |
|  | 5 - i j ( k ) | P i j ( k ) |
|  | 5 - i j ( m ) | P i j ( n ) |
| ... | ... | ... |
| 5 - n |  |  |

PATH SELECTION METHOD AND CONTROL SERVER

REFERENCE TO RELATED APPLICATION

The present invention is based upon and claims the benefit of the priority of Japanese patent application No. 2011-024046, filed on Feb. 7, 2011, the disclosure of which is incorporated herein in its entirety by reference thereto. The present invention relates to a communication method, a control server, and a communication system. In particular, it relates to: a communication method, a control server; and a communication system in which nodes arranged in a network forward traffic flows and realize communication.

BACKGROUND

Technical Field

There is known a communication network system in which a management server manages a communication network including a plurality of nodes in a centralized manner. When the management server receives a path setting request relating to a certain traffic flow, the management server determines a communication path for the traffic flow in the communication network. The management server that determines a traffic communication path in this way will hereinafter be referred to as a "control server."

NPL 1 discloses Dijkstra's Algorithm as an algorithm for calculating the shortest path from a source node to a destination node. However, when communications of a plurality of traffic flows are executed between these source and destination nodes, if Dijkstra's algorithm is simply used, the same communication path (shortest path) is set in this plurality of traffic flows. This increases load on the communication path and decreases the communication efficiency.

For load balancing, it is preferable that different communication paths be set to different traffic flows between a source node and a destination node. A possible way to achieve this is to extract other communication paths between these source and destination nodes, in addition to the shortest path. The following techniques are known as techniques for calculating a plurality of communication paths from a source node to a destination node.

NPL 2 discloses "k-shortest path." According to NPL 2, the k shortest paths are extracted by Dijkstra's algorithm, and one of the k shortest paths is randomly allocated as a traffic path. In this way, a plurality of paths from a source node to a destination node can be calculated.

However, if the k-shortest path method is used, Dijkstra's algorithm is used to calculate the communication paths. Thus, an enormous calculation amount is required, counted as a problem.

NPL 3 discloses a method using an algorithm for calculating a path from a source node to a destination node while preventing an increase of the calculation amount and achieving load balancing. According to NPL 3, a node on the path generates a table including probabilities of forwarding to the destination and forwards packets based on a probability in this forwarding probability table. A forwarding probability is calculated based on a link cost of the node on the path, a weighting matrix calculated by using the link cost, and a setting parameter γ. In this case, the forwarding probability table stores neighboring nodes with respect to the destination node and probabilities of forwarding to the neighboring nodes. Once a destination node address is determined, the node forwards packets to a neighboring node based on a probability.

While NPL 3 discloses a method for packet forwarding based on the probability, NPL 4 discloses a method for extending this method to a method for flow forwarding.

According to the method disclosed in NPL 3, since the forwarding probability table can easily be configured, an increase of the calculation amount can be prevented.

CITATION LIST

Non Patent Literature (NPL)

[NPL 1]
Edsger W. Dijkstra, "A Note on Two Problems in Connexion with Graphs" Numerische Mathematik, vol. 1, pp. 269-271 (1959)

[NPL 2]
D. Eppstein, "Finding the k Shortest Paths," Mar. 31, 1997.

[NPL 3]
Y. Honma, M. Aida, H. Shimonishi and A. Iwata, "A New Multi-path Routing Methodology Based on Logit Type Assignment," In FutureNet II, 2009.

[NPL 4]
Yusuke Shinohara, Yasunobu Chiba, Hideyuki Shimonishi, Yudai Honma, Masaki Aida, "An Efficient Multipath Routing Algorithm for Datacenter Networks and its Implementation on OpenFlow-based Network," IEICE, vol, 109, no. 448, NS2009-164, pp. 13-18

[NPL 5]
Nick McKeown, and seven others, "OpenFlow: Enabling Innovation in Campus Networks," [online], [searched on Feb. 4, 2011], Internet <http://www.openflowswitch.org/documents/openflow-wp-latest.pdf>

SUMMARY

The entire disclosure of the above NPLs is incorporated herein by reference thereto. The following analysis has been given by the present invention.

If the forwarding probability table is established and the algorithm of forwarding a traffic flow based on a probability in the forwarding probability table is used, an optimum value of the setting parameter γ differs depending on a network status by a network topology and a traffic pattern. Thus, it is difficult to set the setting parameter γ suitable to a network status. This prevents efficient use of a network.

To use a network efficiently, it is necessary that an optimum setting parameter γ be set at all times.

As a solution to this issue, namely, to set an optimum value of the setting parameter γ suitable to a network status, various values of the setting parameter γ can actually be set and tested manually or mechanically in a network to be used. In this case, a setting parameter, which achieves a high average throughput and with which the network can efficiently be used, can be set statically.

However, since the setting parameter γ can be a value from 0 to infinity, it is impossible to search for an optimum setting parameter γ in a realistic time period. In addition, even if an optimum setting parameter γ could be searched for, if the traffic pattern or the network topology changes, an optimum setting parameter γ needs to be searched for, again. This is inefficient.

It is an object of the present invention to use a network efficiently by dynamically setting a setting parameter γ suitable to a network status.

According to a first aspect of the present invention, there is provided a path selection method, controlling a network in which a plurality of paths from a source to a destination exist based on an inter-node traffic forwarding probability. The path selection method comprises: calculating an inter-node traffic forwarding probability from a parameter value relating to path selection; calculating a link cost when the parameter value is used by using the inter-node traffic forwarding probability and a communication amount; calculating a cost (end-to-end cost) that a traffic flow experiences end-to-end by using the inter-node traffic forwarding probability and the link cost; and using an inter-node traffic forwarding probability with which the cost (end-to-end cost) reaches a minimum value. This method is associated with a certain machine, that is, with a control apparatus controlling nodes arranged in a network.

According to a second aspect of the present invention, there is provided a control server comprising: a unit that calculates an inter-node traffic forwarding probability from a parameter value relating to path selection; a unit that calculates a link cost when the parameter value is used by using the inter-node traffic forwarding probability and a communication amount; a unit that calculates a cost (end-to-end cost) that a traffic flow experiences end-to-end by using the inter-node traffic forwarding probability and the link cost; a unit that randomly selects a next node from among next node candidates based on an inter-node traffic forwarding probability with which the cost (end-to-end cost) reaches a minimum value. The control server controls a traffic flow in a network in which a plurality of paths from a source to a destination exist based on the inter-node traffic forwarding probability.

According to a third aspect of the present invention, there is provided a program for establishing a forwarding probability table and forwarding a traffic flow based on a probability in the forwarding probability table. The program causes a computer to execute processes of: calculating a link cost and the sum of the link costs that a traffic flow experiences end-to-end based on a network status by a network topology and a traffic pattern; and calculating a setting parameter γ with which the calculated value of the sum of the link costs that a traffic flow experiences end-to-end reaches a minimum value. This program can be recorded in a computer-readable storage medium. Namely, the present invention can be embodied as a computer program product.

The meritorious effects of the present invention are summarized as follows.

According to the present disclosure, a network can be used efficiently by setting an optimum setting parameter value.

BRIEF DESCRIPTION OF DRAWINGS

FIG. 4 is a conceptual diagram of a forwarding probability table.

PREFERRED MODES

An exemplary embodiment of the present disclosure will be described with reference to the attached drawings.

1. Communication Network System

Figure 1:
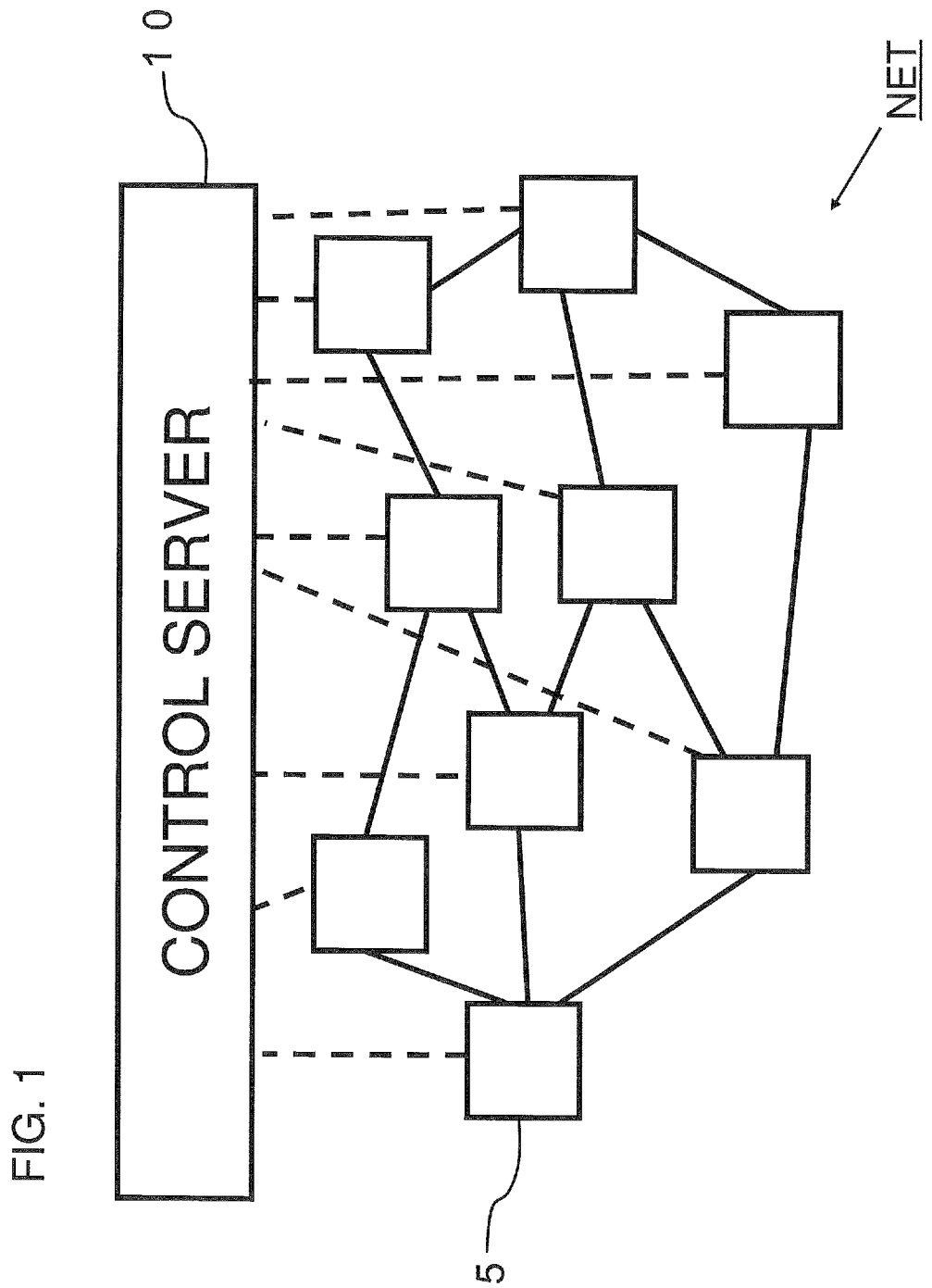
FIG. 1 schematically illustrates a communication system according to a first exemplary embodiment of the present disclosure.

FIG. 1 schematically illustrates a communication network system 1 according to a first exemplary embodiment of the present disclosure. The communication network system 1 includes a communication network NET including a plurality of nodes 5. The present exemplary embodiment will be described assuming that the communication network NET includes n nodes 5-1 to 5-$n$ ($n$ is an integer of 2 or more).

When a communication path is determined, the control server 10 instructs each node 5 on the determined communication path to forward data (packets, frames) of the traffic flow along the determined communication path. Each node 5 performs setting for itself in accordance with the instruction.

For example, each node 5 is provided with a "forwarding table," which represents a correspondence relationship between a source and a destination of a traffic flow. By referring to its forwarding table, each node 5 can forward a traffic flow received from an input source to a specified destination. In this case, the control server 10 instructs each node 5 to set a forwarding table, so that the traffic flow is forwarded along the above determined communication path. Each node 5 sets the content of it's own forwarding table, in accordance with the instruction from the control server 10.

NPL 5 proposes a technique called OpenFlow as an interface scheme between the control server 10 and the plurality of nodes 5 that realize such processing. OpenFlow recognizes communications as flows and performs path control, failure recovery, load balancing, and optimization on a per-flow basis. An OpenFlow switch serving as a forwarding node has a secure channel for communication with an OpenFlow controller and operates according to a flow table suitably instructed for adding or rewriting by the OpenFlow controller. In the flow table, a set of the followings is defined for each flow: rule(s) against which a packet header is matched; action(s) that define processing contents; and flow statistical information.

For example, upon receiving a first packet, the OpenFlow switch searches in the flow table for an entry having a rule (FlowKey) matching header information of the received (incoming) packet. As a result of the search, if the OpenFlow switch finds an entry matching the incoming packet, the OpenFlow switch executes the processing content described in an action field of the entry on the incoming packet. In contrast, if, as a result of the search, the OpenFlow switch does not find an entry matching the incoming packet, the OpenFlow switch forwards the incoming packet to the OpenFlow controller via the secure channel and requests the OpenFlow controller to determine a packet path based on the source and destination of the incoming packet. Subsequently, the OpenFlow switch receives a flow entry realizing the packet path and updates the flow table.

2. Outline of Path Setting Process

Figure 2:
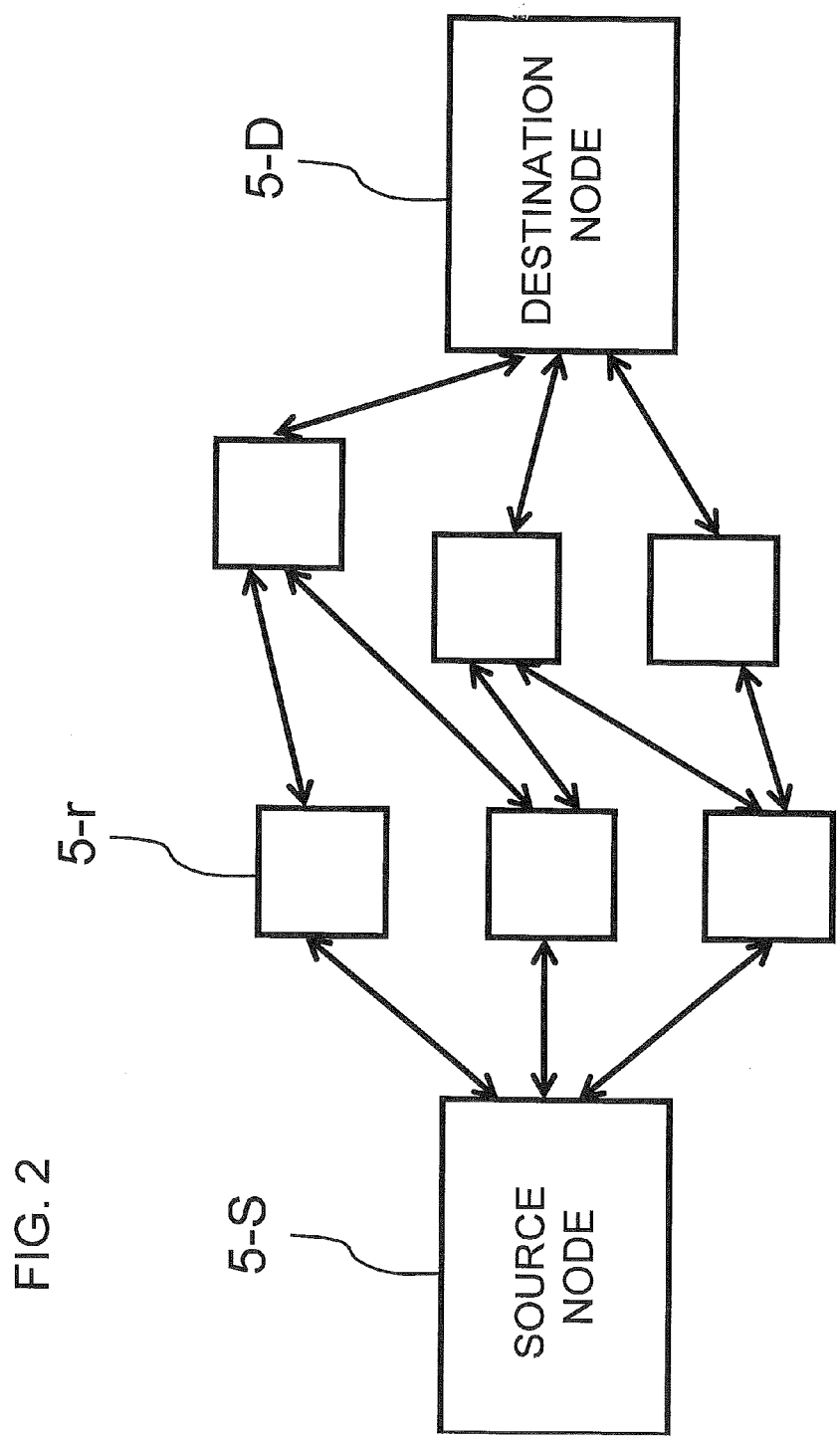
FIG. 2 is a conceptual diagram illustrating communication paths from a source node to a destination node.

FIG. 2 is a conceptual diagram illustrating a plurality of communication paths from a source node 5-S to a destination node 5-D. As illustrated in FIG. 2, in many cases, a plurality of communication paths exist from the source node 5-S to the destination node 5-D. Each communication path includes certain number of relay nodes 5-$r$, and different communication paths are configured by different combinations of relay nodes 5-$r$.

3. Forwarding Probability Table

A forwarding probability table 400 can be configured based on network information including a link cost and topology information from the communication network.

To explain the forwarding probability table 400, a "target node and a "next hop node" will be described with reference to FIG. 4. A target node 5-$i$ is any one of nodes 5-1 to 5-$n$ (i=1 to n). In addition, a destination node 5-$j$ is any one of the nodes 5-1 to 5-$n$ and is different from the target node 5-$i$ (j=1 to n, j≠i). The following description will be made based on an example in which a traffic flow is transmitted from the target node 5-$i$ to the destination node 5-$j$. In this case, the next node, to which the target node 5-$i$ transmits the traffic flow, is a "next hop node 5-$ij$." Namely, for the target node 5-$i$, the next hop node 5-$ij$ is the next hop node through which the traffic flow travels. A target node 5-$i$ has a plurality of candidates for the next hop node 5-$ij$. If m candidates exist (m is a natural number), these candidates are denoted by 5-$ij$(1) to 5-$ij$(m). If this is generalized, the next hop node candidates 5-$ij$(k) (k=1 to m) exist for a target node 5-$i$. The next hop node candidates 5-$ij$(k) may be located farther than the destination node 5-$j$.

The forwarding probability table 400 represents "next hop information" that indicates the above-described next hop node candidates. More specifically, the nodes 5-1 to 5-$n$ are provided with respective forwarding probability tables 400-1 to 400-$n$. Namely, a target node 5-$i$ and a forwarding probability table 400-$i$ are associated with each other. The forwarding probability table 400-$i$ indicates the next hop node candidates 5-$ij$(k) of the target node 5-$i$.

FIG. 4 illustrates the forwarding probability table 400-$i$ for the target node 5-$i$. As illustrated in FIG. 4, the forwarding probability table 400-$i$ indicates the next hop node candidates 5-$ij$(k) per destination node 5-$j$ (j=1 to n, j≠i). In addition, the forwarding probability table 400-$i$ indicates a "selection probability Pij(k)" defined for each next hop node candidate 5-$ij$(k). The selection probability Pij(k) is a probability with which a next hop node 5-$ij$(k) is selected from among the m next hop node candidates 5-$ij$(1) to 5-$ij$(m).

The control server 10 according to the present exemplary embodiment forwards a traffic flow based on a probability in a forwarding probability table 400.

The above path setting process is realized by causing the control server 10 to execute a path setting program. The path setting program is a computer program executed by the control server 10 and may be recorded in a computer-readable recording medium (in a non-transient recording medium, in particular).

4. Various Examples of Control Server

4-1. First Exemplary Embodiment

Figure 3:
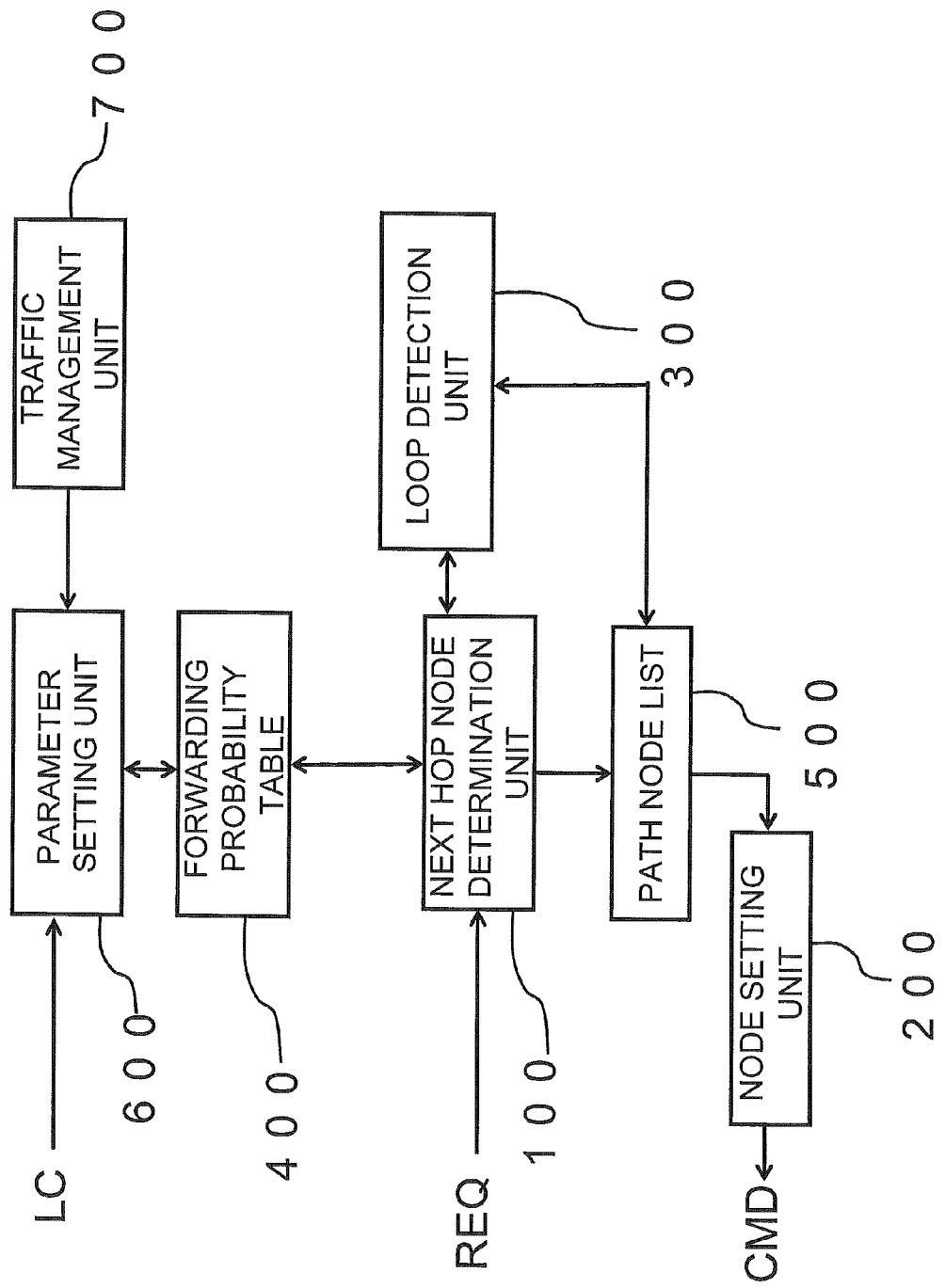
FIG. 3 is a block diagram illustrating a configuration of a control server according to the first exemplary embodiment of the present disclosure.

FIG. 3 is a block diagram illustrating a configuration of the control server 10 according to the first exemplary embodiment of the present disclosure. The control server 10 includes a next hop node determination unit 100, a node setting unit 200, a loop detection unit 300, a forwarding probability table 400, a path node list 500, a parameter setting unit 600, and a traffic management unit 700.

The next hop node determination unit 100 acquires the next hop node candidates of a target node and the forwarding probabilities of the candidates from the forwarding probability table 400 and selects one node from the next hop node candidates. In addition, the next hop node determination unit 100 updates the target node to the selected next hop node and perform additional writing into the path node list 500. In addition, a setting parameter γ used for establishing the forwarding probability table is determined by the parameter setting unit 600. To grasp the communication amounts of (at) all the node pairs, the parameter setting unit 600 acquires edge nodes, through which traffic flows travel, from the traffic management unit 700.

Figure 5:
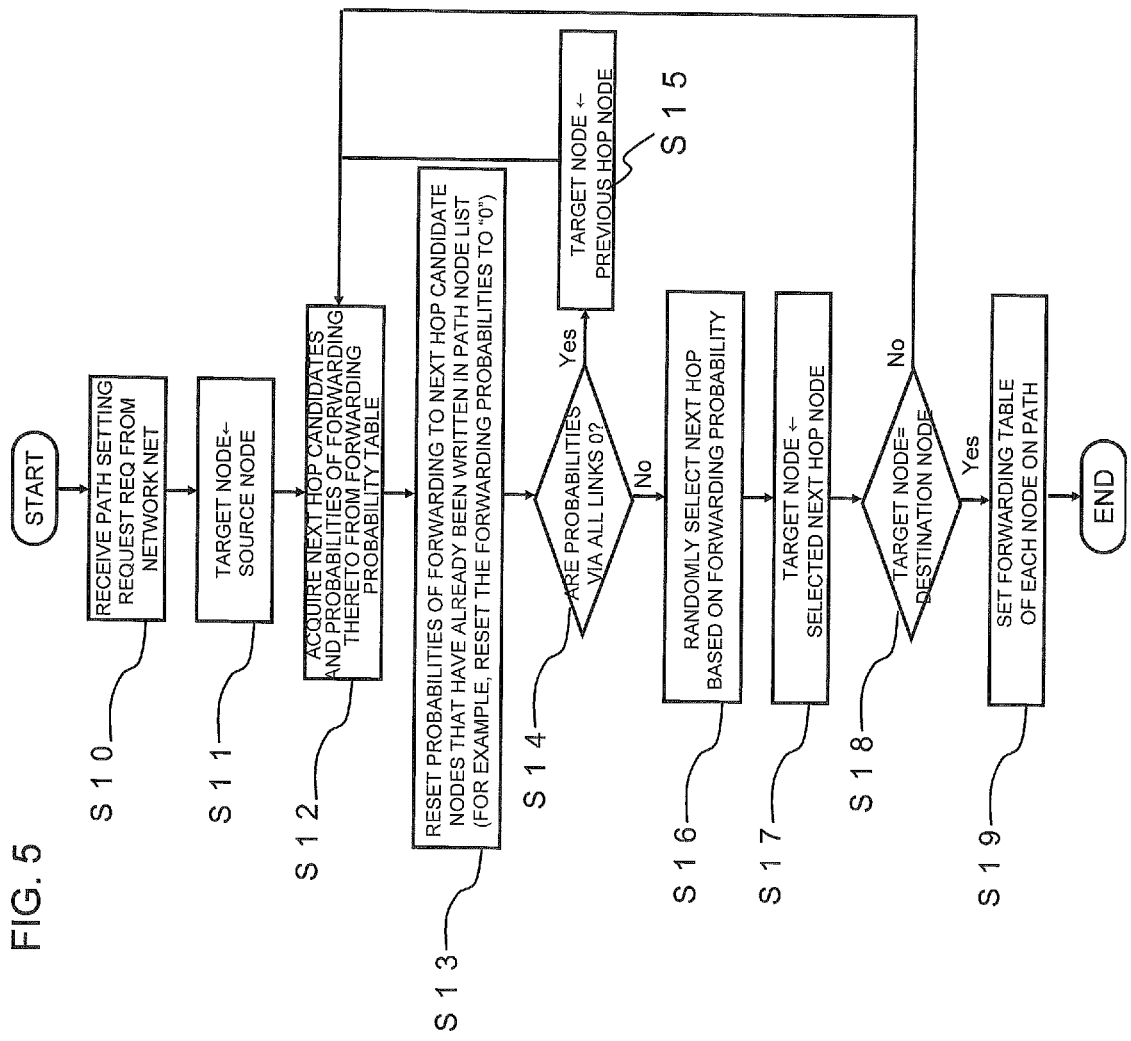
FIG. 5 is a flow chart illustrating a path setting method according to the first exemplary embodiment of the present disclosure.

FIG. 5 is a flow chart illustrating a path setting process according to the present exemplary embodiment. Hereinafter, the path setting process according to the present exemplary embodiment will be described in detail.

Step S10:
When a traffic flow is generated, the next hop node determination unit 100 receives a path setting request REQ relating to the traffic flow from the communication network NET. The path setting request REQ indicates a source node 5-S and a destination node 5-D of the traffic flow.

Step S11:
The next hop node determination unit 100 receives the path setting request REQ and recognizes the source node 5-S and the destination node 5-D. Next, the next hop node determination unit 100 initially sets the source node 5-S as the target node 5-$i$.

Step S12:
The next hop node determination unit 100 acquires next hop candidates and probabilities of forwarding thereto from the forwarding probability table 400 associated with the target node 5-$i$.

Step S13:
Among the next hop candidates acquired in step S12, the loop detection unit 300 resets the probabilities of forwarding to the nodes that have already been written in the path node list 500 (nodes through which the traffic flow has already traveled) to be values smaller than those of the probabilities of forwarding to the nodes that have not been written in the path node list 500 among the next hop candidates. Consequently, the nodes through which the traffic flow has already traveled are prevented from being selected as the next hop node. Such nodes that have already been written in the path node list 500 among the next hop candidates form a loop on a traffic transmission path. By resetting the probabilities of forwarding to these nodes as described above, selection of these nodes that form a loop can be prevented when the next hop is subsequently determined based on the forwarding probability. As a result, there is no need to execute a process such as for degeneration of a path forming a loop. Since an increase of the calculation amount can be prevented even in an environment in which many routing loops are generated, prompt path setting can be executed.

In the above description, the probabilities of forwarding to the nodes that have already been written in the path node list 500 are reset to smaller values. However, the present disclosure is not limited to such example. The present disclosure is applicable as long as the probabilities of forwarding to the nodes that have already been written in the path node list 500 are reset so that none of these nodes are not selected as the next hop. For example, the present disclosure includes a process of setting the probabilities of forwarding to the nodes that have already been written in the path node list 500 to "0" and a process of excluding these nodes from the next hop candidates.

Step S14:

As a result of step S13, there are cases where forwarding to all the next hop candidates is prevented. Examples of such cases include a case where the probabilities of forwarding to all the next hop candidates fall below a predetermined threshold, a case where the probabilities of forwarding to all the next hop candidates are set to "0," and a case where all the next hop candidates are excluded from the next hop forwarding targets. Thus, in step S14, whether forwarding to all the next hop candidates is prevented is determined. Next, the flow chart in FIG. 5 will be described, assuming that the probabilities of forwarding to the nodes that have already been written in the path node list 500 are reset to "0." After setting the probabilities of forwarding to the nodes that have already been written in the path node list 500 to 0 in step S13, the control server 10 determines whether the probabilities of forwarding to all the next hop candidate nodes are 0.

Step S15:

As a result of setting the probabilities of forwarding to the nodes that have already been written in the path node list 500 to 0 in step S13, if the probabilities of forwarding to all the next hop candidate nodes are 0 (step S14; Yes), the previous hop node is set to the target node 5-$i$ and step S12 is executed again.

Step S16:

As a result of setting the probabilities of forwarding to the nodes that have already been written in the path node list 500 to 0 in step S13, if the probabilities of forwarding to the next hop candidate nodes are not all 0 (step S14; No), the next hop node determination unit 100 acquires next hop candidates and the probabilities of forwarding thereto from the forwarding probability table and randomly selects one next hop node 5-$ij$ from among the next hop node candidates 5-$ij$(1) to 5-$ij$(m). For example, the next hop node determination unit 100 uses a random number and a selection probability Pij(k). The sum of the forward probabilities may be not necessarily 1.0.

For example, assuming that m=3 and selection probabilities Pij(1) to Pij(3) of the next hop node candidates 5-$ij$(1) to 5-$ij$(3) are 0.2, 0.3, and 0.6, respectively, numerical value ranges depending on the selection probabilities Pij(1) to Pij(3) are defined for the next hop node candidates 5-$ij$(1) to 5-$ij$(3). For example, the next hop node determination unit 100 associates a range ranging from 0.0 to less than 0.2 with the next hop node candidate 5-$ij$(1), a range ranging from 0.2 to less than 0.5 with the next hop node candidate 5-$ij$(2), and a range ranging from 0.5 to less than 1.1 with the next hop node candidate 5-$ij$(3). Next, since the sum of the forward probabilities is not necessarily 1.0, the next hop node determination unit 100 generates a random number X within a range from 0.0 to less than the sum of the forward probabilities. Next, the next hop node determination unit 100 selects a next hop node candidate associated with a numerical value range including the generated random number X. For example, if the random number X is 0.3, the next hop node determination unit 100 selects the next hop node candidate 5-$ij$(2). In this way, in accordance with the selection probability Pij(k) and randomly, one next hop node 5-$ij$ can be selected.

Step S17:

After selecting the next hop node 5-$ij$, the next hop node determination unit 100 stores the selected next hop node 5-$ij$ in the path node list 500 as a relay node 5-$r$. In addition, the next hop node determination unit 100 updates the target node 5-$i$ to the selected next hop node 5-$ij$.

Step S18:

After completing the next hop determination process, the next hop node determination unit 100 determines whether the updated target node 5-$i$ (selected next hop node) matches the destination node 5-D. Namely, the next hop node determination unit 100 determines whether or not the target node 5-$i$ has reached the destination node 5-D.

If the target node 5-$i$ has not yet reached the destination node 5-D (step S18; No), the operation returns to step S12, and the next hop node determination unit 100 executes the next hop determination process for a new target node 5-$i$.

The above process is repeated, and the next hop node determination unit 100 randomly per hop determines relay nodes 5-$r$ from the source node 5-S to the destination node 5-D. Finally, the target node 5-$i$ reaches the destination node 5-D (step S18; Yes). Namely, a communication path from the source node 5-S to the destination node 5-D is determined. In this way, by repeating the next hop determination process, the next hop node determination unit 100 according to the present exemplary embodiment randomly per hop determines a communication path from the source node 5-S to the destination node 5-D.

Step S19:

After the communication path is determined, the node setting unit 200 instructs each node 5 on the determined communication path to forward the traffic flow along the determined communication path. More specifically, the node setting unit 200 transmits a forwarding table setting command CMD to each node 5 registered in the path node list 500. The forwarding table setting command CMD is a command for instructing each node to set the forwarding table thereof so that the traffic flow is forwarded along the determined communication path.

Each node 5 on the determined communication path receives the forwarding table setting command CMD from the control server 10 and sets the content of the forwarding table thereof accordingly. In this way, data of the traffic flow is forwarded from the source node 5-S to the destination node 5-D.

While the present exemplary embodiment has been described by illustrating a path setting method that eliminates a loop caused by centralized control, the present disclosure can be realized by using a path setting method that eliminates a loop caused by distributed control.

Figure 6:
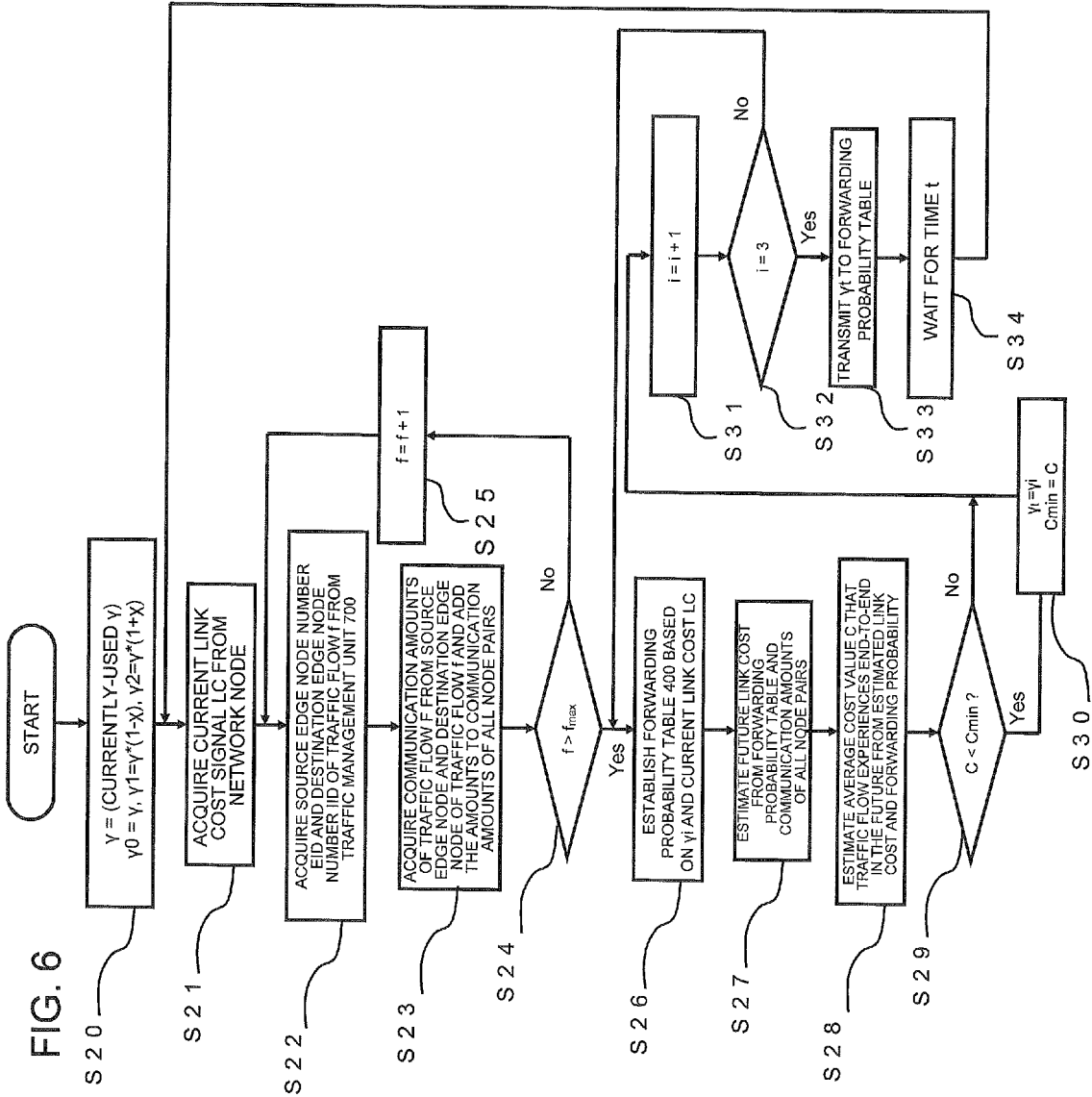
FIG. 6 is a flow chart illustrating a method of setting a setting parameter γ according to the first exemplary embodiment of the present disclosure.

FIG. 6 is a flow chart illustrating a method of setting a setting parameter γ according to the first exemplary embodiment. In the present exemplary embodiment, a certain setting parameter γ is given, and a forwarding probability table 400 is established from a link cost LC and the setting parameter γ. A link cost when the parameter value is used is calculated from the forwarding probability table 400 and the communication amounts of (at or in) all the node pairs, and a cost that a traffic flow experiences end-to-end is calculated from the link cost and the forwarding probability table 400. This process is executed on all the candidates for the setting parameter γ, and a setting parameter γ with which the traffic flow experiences the lowest cost end-to-end is selected. Hereinafter, a process of setting a setting parameter γ according to the present exemplary embodiment will be described in detail.

Step S20:

When the process of setting a setting parameter γ is started, candidates γi for the setting parameter γ are set. The 0-th, 1st, and 2nd candidates γ0, γ1, and γ2 for the setting parameter γ are set to the currently-used setting parameter γ, γ×(1−x), and γ×(1+x), respectively. "x" represents a numerical value of 0.0 or more. While three setting parameter candidates γ, γ×(1−x), and γ×(1+x) are used as examples, the present disclosure is not limited thereto. The present disclosure is applicable as long as the setting parameter is selected from a plurality of setting parameter candidates γ. For example, the present disclosure includes a method of setting two or more candidates for the setting parameter γ and a method of extracting candidates for the setting parameter γ by a bisection method or a golden section method.

Step S21:
The parameter setting unit 600 receives a current link cost LC from the communication network NET. The link cost LC is a link cost of a node and can be a link utilization rate, a propagation delay, a loss rate, or the like.

Step S22:
The parameter setting unit 600 acquires a source edge node number EID or a destination edge node number IID of a traffic flow f from a traffic management unit 700.

Step S23:
The parameter setting unit 600 acquires the transmitted data amount of the source edge node and the received data amount of the destination edge node of the traffic flow f from the edge node number EID or the edge node number IID and adds the amounts to the communication amounts of all the node pairs.

Step S24:
The parameter setting unit 600 checks whether or not the number of traffic flows whose transmitted and received data amounts are acquired has reached an examination flow number fmax to be examined. The examination flow number fmax is a value that is sufficiently large and is smaller than the number of traffic flows managed.

Step S25:
In step S24, if the number of traffic flows whose transmitted and received data amounts are acquired has not reached the examination traffic number fmax (step S24; No), the number of the traffic flow f is incremented by 1.

Step S26:
In step S24, if the number of traffic flows whose transmitted and received data amounts are acquired has reached the examination traffic flow number fmax (step S24; Yes), the forwarding probability table 400 is established from the candidate γ0 for the setting parameter γ and the link cost LC. There are various methods of establishing the forwarding probability table 400 from the candidate γ0 for the setting parameter γ and the link cost LC. For example, in NPL 3, the forwarding probability table 400 is established by the following formula [mathematical formula 1].

$$p(j \mid i) = \exp(-\gamma \cdot c_{ij}) \cdot \frac{W_{jd}}{W_{id}} \quad \text{[Mathematical formula 1]}$$

$$W = (I - A)^{-1}$$

$$a_{ij} = \begin{cases} \exp(-\gamma \cdot c_{ij}) & \text{when a link exists between nodes } i \text{ and } j \\ 0 & \text{when a link does not exists between nodes } i \text{ and } j \end{cases}$$

In the above mathematical formula, p(j|i) represents an element in the forwarding probability table 400 and d represents a destination node. The mathematical formula represents a forwarding probability from a target node i to a next hop node j. In addition, cij represents a link cost between link cost nodes i and j and I represents a unit matrix.

Step S27:
A link cost LC2 when the parameter is used is calculated (estimated) from the forwarding probability table 400 and the communication amounts of all the node pairs. The probability that the link between the nodes i and j is used when communication from a source node s to a destination node d is executed is calculated by using the forwarding probability table 400. By multiplying this with the communication amounts from the source node s to the destination node d obtained from the communication amounts of all the node pairs, the communication amount flowing in the link between the nodes i and j can be obtained. By executing this process on all source nodes s and destination nodes d, the link use amount between the nodes i and j is calculated. Based on this use amount, the link cost LC2 when the parameter is used is calculated (estimated). There are various conceivable methods of calculating the link cost LC2 when this parameter is used. For example, when the link cost LC is defined as a link utilization rate, the link cost LC2 can be calculated by the following formula [mathematical formula 2].

$$p_{sdij} = w_{si} \cdot \exp(-\gamma \cdot c_{ij}) \cdot w_{jd} / w_{sd} \quad \text{[Mathematical formula 2]}$$

$$l_{ij} = \sum_s \sum_d p_{sdij} \cdot O_{sd}$$

$$c'_{ij} = c_{ij} + l_{ij} / (bw_{ij} \cdot t)$$

A link cost LC2 after time t is calculated by using the above formula [mathematical formula 2]. c'ij represents the link cost LC2 after time t, that is, the link cost between the nodes i and j after time t. In addition, Osd represents the transmitted/received data amount from the source node s to the destination node d and bwij represents the link capacity between the nodes i and j.

Step S28:
A cost average value C that the traffic flow experiences end-to-end in case where the parameter value is used is calculated from the calculated link cost LC2 in case where the parameter value is used and the forwarding probability table 400. By multiplying the link cost of the link between the nodes i and j in case where the parameter value is used obtained from the link cost LC2 in case where the parameter value is used with the probability that the link between the nodes i and j in communication between the source node s and the destination node d, the average cost that the traffic flow experiences end-to-end in case where the parameter value is used in communication between the source node s and the destination node d is calculated. In addition, by executing this process on all the pairs of source nodes s and destination nodes d, the average value is calculated as the cost average value C that the traffic flow experiences end-to-end when the parameter value is used. There are various conceivable methods of calculating the cost average value C that the traffic flow experiences end-to-end when this parameter value is used. For example, the cost average value C can be calculated in accordance with the following formula [mathematical formula 3].

$$\overline{C_{sd}} = \sum_i \sum_j p_{sdij} \cdot c'_{ij} \quad \text{[Mathematical formula 3]}$$

$$C = \sum_s \sum_d \overline{C_{sd}}$$

Step S29:
The parameter setting unit 600 determines whether or not the calculated cost average value C that the traffic flow experiences end-to-end in case where the parameter value is used is smaller than a minimum value Cmin among the cost average values that have been calculated and that the traffic flow experiences end-to-end.

Step S30:
In step S29, if the cost average value C that the traffic flow experiences end-to-end in case where the parameter value is used is smaller than the minimum value Cmin of the cost average values that have been calculated and that the traffic flow experiences end-to-end (step S29; Yes), the minimum value Cmin among the cost average values that have been calculated and that the traffic flow experiences end-to-end is replaced with the calculated cost C that the traffic flow experiences end-to-end after time t. In addition, the optimum value of an setting parameter γt is replaced with the candidate γi for the setting parameter γ.

Step S31:
In step S29, if the cost average value C that the traffic flow experiences end-to-end in case where the parameter value is used is larger than the minimum value CCmin of the cost average values that the traffic flow experiences end-to-end and that have been calculated (step S29; No), the candidate γi for the setting parameter γ is replaced with a candidate for the next setting parameter γ.

Step S32:
Whether i and 3 are equal to each other is determined, to determine whether other candidates for the setting parameter γ would exist. In the present example, the number of parameter candidates is 3. Thus, whether i is equal to this number of parameter candidates is determined.

If i and 3 are not equal to each other in step S32 (step S32; No), the candidate γi for the setting parameter γ is checked again from step S26.

Step S33:
If i and 3 are equal to each other in step S32 (step S32; Yes), the optimum value of the setting parameter γ t is transmitted to the forwarding probability table 400.

Step S34:
After a certain period of time t, an optimum value of the setting parameter γ is searched for again from step S20.

While exemplary embodiments of the present disclosure have thus been described, the present disclosure is not limited thereto. Further variations, substitutions, and adjustments can be made without departing from the basic technical concept of the present disclosure. For example, the number of nodes and the number of control servers controlling the nodes according to the above exemplary embodiments are used as examples to facilitate description of the present disclosure. Namely, the above numbers can be changed as needed.

Finally, preferable modes of the present disclosure will be summarized.

[Mode 1]
Mode 1 corresponds to the path selection method according to the first aspect.

[Mode 2]
In mode 1, it is preferable that an inter-node traffic forwarding probability with which a cost that a traffic flow experiences end-to-end reaches a minimum value is selectively determined from a plurality of inter-node traffic forwarding probabilities.

[Mode 3]
In mode 1 or 2, also link costs of all links when the parameter value is used can be calculated, and a cost that a traffic flow experiences end-to-end can be calculated based on the link costs.

[Mode 4]
In any one of modes 1 to 3, link costs of all links in case where the parameter value is used can be calculated based on communication amounts of all node pairs and an inter-node traffic forwarding probability.

[Mode 5]
Mode 5 corresponds to the control server according to the second aspect.

[Mode 6]
In mode 5, it is preferable that the control server selectively determine an inter-node traffic forwarding probability with which a cost that a traffic flow experiences end-to-end reaches a minimum value from a plurality of inter-node traffic forwarding probabilities.

[Mode 7]
In mode 5 or 6, the control server can calculate link costs of all links when the parameter value is used and can calculate a cost that a traffic flow experiences end-to-end based on the link costs.

[Mode 8]
In any one of modes 5 to 7, the control server can calculate link costs of all links when the parameter value is used based on communication amounts of all node pairs and an inter-node traffic forwarding probability. The control server according to any one of claims 1 to 3.

[Mode 9]
Mode 9 corresponds to the (computer) program according to the third aspect. As in the path selection method in mode 1, regarding each component and step, the program can similarly be extended to modes 2 to 4.

Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by one skilled in the art according to the overall disclosure including the claims and the technical concept.

REFERENCE SIGNS LIST

1 communication network system
5 node
5-S source node
5-D destination node
5-$i$ target node
5-$j$ destination node
10 control server
100 next hop node determination unit
200 node setting unit
300 loop detection unit
400 forwarding probability table
500 path node list
600 parameter setting unit
700 traffic management unit
NET communication network
REQ path design request
CMD forwarding table setting command
LC link cost
LC2 link cost in case where the parameter value is used
C cost average value that traffic flow experiences end-to-end
fmax examination traffic number
Cmin minimum value of cost average values that have been calculated and that traffic flow experiences end-to-end
γ setting parameter
γi candidate for i-th setting parameter γ

What is claimed is:

1. A control server, comprising:
a unit that calculates an inter-node traffic forwarding probability from a parameter value relating to path selection;
a unit that calculates a link cost when the parameter value is used by using the inter-node traffic forwarding probability and a communication amount;
a unit that calculates a cost that a traffic flow experiences end-to-end by using the inter-node traffic forwarding probability and the link cost;
a unit that calculates a parameter with which the cost reaches a minimum value; and
a unit that randomly selects a next node from among next node candidates based on an inter-node traffic forwarding probability;
wherein the control server controls a traffic flow in a network in which a plurality of paths from a source to a destination exist based on the inter-node traffic forwarding probability.

2. The control server according to claim 1;
wherein the control server selectively determines an inter-node traffic forwarding probability with which a cost that a traffic flow experiences end-to-end reaches a minimum value from a plurality of inter-node traffic forwarding probabilities.

3. The control server according to claim 2,
wherein the control server calculates an inter-node traffic forwarding probability from a parameter value relating to path selection;
wherein the control server calculates link costs of all links when the parameter value is used; and
wherein the control server calculates a cost that a traffic flow experiences end-to-end based on the link costs.

4. The control server according to claim 2,
wherein the control server calculates link costs of all links when the parameter value is used based on communication amounts of all node pairs and an inter-node traffic forwarding probability calculated from a parameter value relating to path selection.

5. The control server according to claim 1;
wherein the control server calculates an inter-node traffic forwarding probability from a parameter value relating to path selection;
wherein the control server calculates link costs of all links when the parameter value is used; and
wherein the control server calculates a cost that a traffic flow experiences end-to-end based on the link costs.

6. The control server according to claim 5,
wherein the control server calculates link costs of all links when the parameter value is used based on communication amounts of all node pairs and an inter-node traffic forwarding probability calculated from a parameter value relating to path selection.

7. The control server according to claim 1;
wherein the control server calculates link costs of all links when the parameter value is used based on communication amounts of all node pairs and an inter-node traffic forwarding probability calculated from a parameter value relating to path selection.

8. A communication system, comprising the control server according to claim 1.

9. A communication system according to claim 8, wherein the communication system further comprises nodes controlled by the control server.

10. A path selection method, controlling a network in which a plurality of paths from a source to a destination exist based on an inter-node traffic forwarding probability, the path selection method comprising:
calculating an inter-node traffic forwarding probability from a parameter value relating to path selection;
estimating a link cost when the parameter value is used by using the inter-node traffic forwarding probability and a communication amount;
calculating a cost that a traffic flow experiences end-to-end by using the inter-node traffic forwarding probability and the link cost; and
using an inter-node traffic forwarding probability with which the cost reaches a minimum value.

11. The path selection method according to claim 10, further comprising:
selectively determining an inter-node traffic forwarding probability with which a cost that a traffic flow experiences end-to-end reaches a minimum value from a plurality of inter-node traffic forwarding probabilities.

12. The path selection method according to claim 11, further comprising:
calculating an inter-node traffic forwarding probability from a parameter value relating to path selection;
calculating link costs of all links when the parameter value is used; and
calculating a cost that a traffic flow experiences end-to-end based on the link costs.

13. The path selection method according to claim 11, further comprising:
calculating link costs of all links when the parameter value is used based on communication amounts of all node pairs and an inter-node traffic forwarding probability calculated from a parameter value relating to path selection.

14. The path selection method according to claim 10, further comprising:
calculating an inter-node traffic forwarding probability from a parameter value relating to path selection;
calculating link costs of all links when the parameter value is used; and
calculating a cost that a traffic flow experiences end-to-end based on the link costs.

15. The path selection method according to claim 14, further comprising:
calculating link costs of all links when the parameter value is used based on communication amounts of all node pairs and an inter-node traffic forwarding probability calculated from a parameter value relating to path selection.

16. The path selection method according to claim 10, further comprising:
calculating link costs of all links when the parameter value is used based on communication amounts of all node pairs and an inter-node traffic forwarding probability calculated from a parameter value relating to path selection.

17. A non-transient computer-readable storage medium that records a program, the program being adapted for establishing a forwarding probability table and forwarding a traffic flow based on a probability in the forwarding probability table,
wherein the program causes a computer to execute processes of:
calculating a link cost and the sum of the link costs that a traffic flow experiences end-to-end based on a network status by a network topology and a traffic pattern; and calculating a setting parameter $\gamma$ with which the calculated value of the sum of the link costs that a traffic flow experiences end-to-end reaches a minimum value.

* * * * *